Nov. 8, 1960  R. PIRAGINO  2,959,437
RESILIENT BEARING
Filed May 20, 1959  2 Sheets-Sheet 1
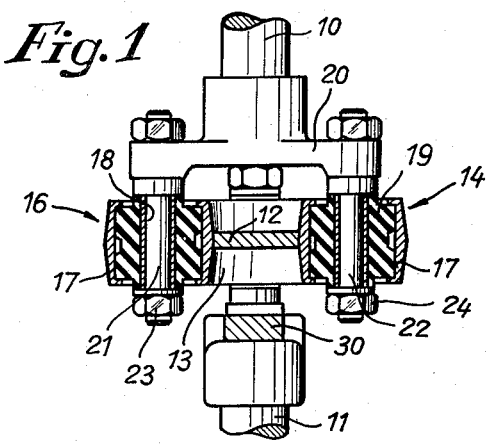
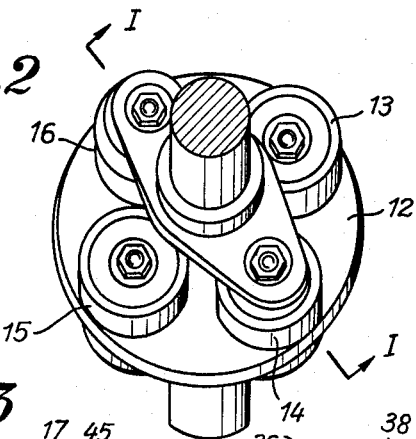
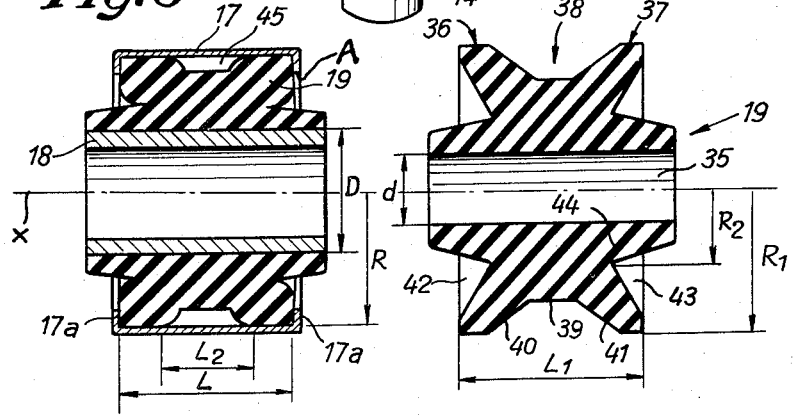

Nov. 8, 1960    R. PIRAGINO    2,959,437
RESILIENT BEARING
Filed May 20, 1959    2 Sheets-Sheet 2
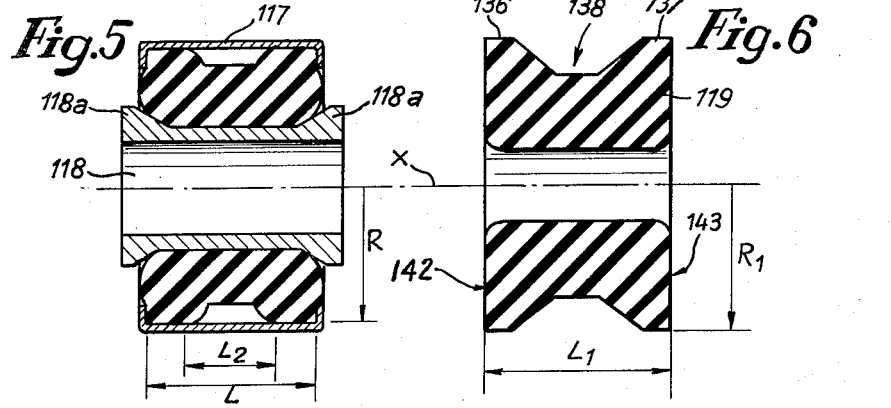
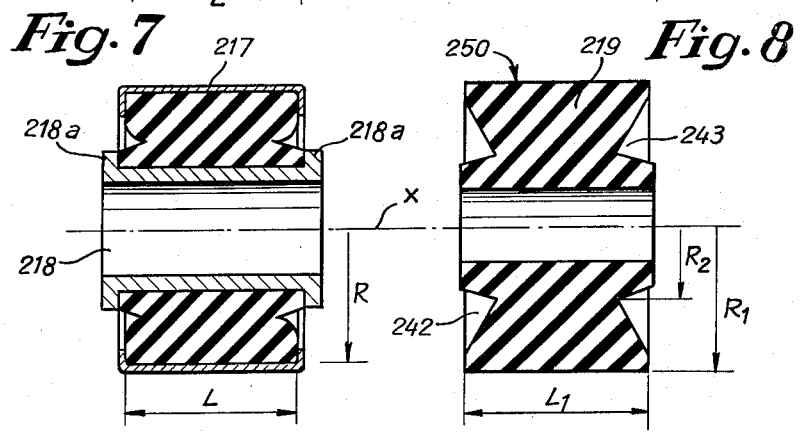
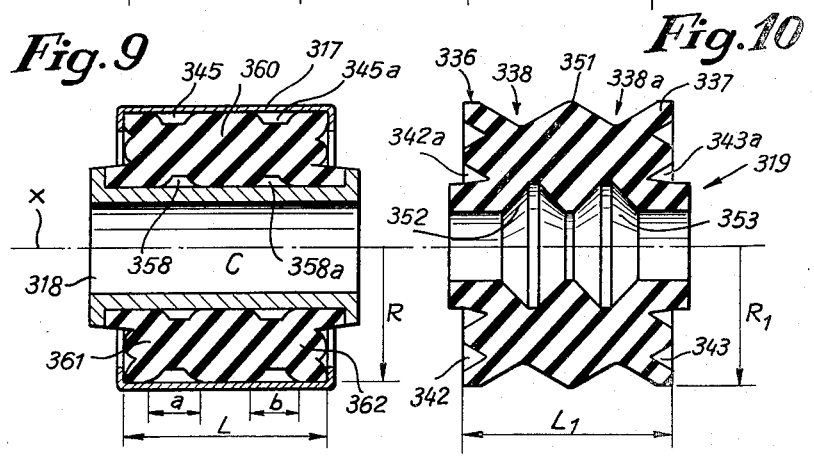

United States Patent Office 2,959,437
Patented Nov. 8, 1960

2,959,437
RESILIENT BEARING

Renato Piragino, Turin, Italy, assignor to RIV Officine di Villar Perosa Societa per Azioni, Turin, Italy Filed May 20, 1959, Ser. No. 814,532

Claims priority, application Italy May 24, 1958

3 Claims. (Cl. 287—85)

This invention relates to resilient hinges of the type in which a ring of rubber or equivalent material referred to hereafter simply as "rubber" is confined between a rigid tubular hub and a rigid external bushing coaxial with the hub, the hub and bushing constituting the so-called armatures of the hinge.

Resilient hinges of this type are suitable for a variety of uses, more particularly in automotive constructions, such as in suspensions, steering linkage, resilient transmission shafts and other structures.

This invention is especially, though not exclusively suitable for use in resilient hinges consisting of resilient joints for transmission shafts, its main object being to provide improvements in hinges of the above defined type, so as to make the hinge capable of resiliently taking up considerable torque and jerks, though it is extremely flexible in all directions and it allows considerable angular deflections of the two shaft sections interconnected by the joint.

It is known that resilient joints adapted to transmit high torque behave in a relatively rigid manner in respect of axial deflection, axial staggering and axial displacements of the shafts interconnected by the joint. Moreover, such joints do not resiliently take up sharp variations in torque (jerks) unless rubber rings of considerable volume or considerable radial thickness are resorted to. This implies a considerable rubber consumption and, on the other hand, it impairs the life of the joint due to considerable heat by hysteresis which, since it can hardly be dissipated to the outside leads to considerable overheating of the rubber, hence to rapid deterioration.

It should further be noted that a small space only is often available, which cannot accommodate large rubber volumes.

This invention removes the abovementioned disadvantages.

According to a broader scope of this invention difficulties met with heretofore are avoided in a resilient joint of the type defined above by pre-stressing radially at least, the rubber ring between the hub and bushing, the rubber ring being formed under such conditions with at least one annular groove on at least one of its circumferential surfaces contacting the armatures, or its end surfaces.

Various embodiments of this invention shall be described hereafter referring to the accompanying drawing. Before proceeding with a detailed description it should be emphasized at this stage that the rubber ring is formed in the preferred embodiment of the resilient hinge with three grooves, namely one groove on its circumferential surface, the said groove being situated on the transverse middle plane of the ring and preferably ranging in width between one fourth and one half the overall width of the ring in its assembled condition, in which it is pre-stressed between the hub and outer bushing, two further grooves being formed each on either end surface of the ring, the latter grooves being preferably of V-shaped profile, their bottom circumference substantially equalling in radius one half the maximum radius of the ring in its free or non pre-stressed condition.

In the accompanying drawing:

Figure 1 is an axial sectional view of a resilient joint comprising resilient hinges according to this invention, the section being taken on line I—I of Figure 2, Figure 2 is a perspective view of a joint, Figure 3 is an axial sectional view of one resilient hinge employed in the structure shown in Figures 1 and 2;

Figure 4 is an axial sectional view of the rubber ring employed in the embodiment shown in Figure 3 in a free condition;

Figures 5, 7 and 9 are axial sectional views of three further embodiments and

Figures 6, 8 and 10 are axial sectional views of the rubber rings in a free condition, as employed in the embodiments shown in Figures 5, 7 and 9, respectively.

Referring first to Figures 1 and 2 which show a resilient joint for transmitting torque between two shafts 10, 11, the resilient joint comprises a circular metal disc 12, carrying a circular row of four equally spaced resilient hinges 13, 14, 15 and 16. The hinges each comprises an outer metal bushing 17 arranged with its axis parallel with the middle axis of the disc 12, a tubular hub 18 coaxial with the bushing 17 and a rubber ring 19 pre-stressed between the hub 18 and bushing 17. The shaft 10 has securely fastened thereto a metal bridge piece 20 having secured to its opposite ends axial bolts 21, 22 on which the hubs 18 of the hinges 16, 14 are fitted. Nuts 23, 24, screwed on the free ends of their respective bolts 21, 22, securely attach the hubs to the bolts.

Similarly, the shaft 11 has securely fastened thereto a bridge piece 30 connected with the hubs of the further two hinges 13, 15 in the manner described above in connection with the bridge piece 20. The two bridge pieces are therefore angularly staggered through 90°, since they are connected with two diametrically opposite pairs of hinges 13, 15 and 14, 16, respectively.

Figures 3, 4 are detailed views of any of the four resilient hinges 13 to 16 employed in the joint shown in Figures 1 and 2.

The geometrical axis of the hinge is indicated by X. The hub 18 comprises a tubular metal section uniform in outer diameter D. The bushing 17 is cylindrical, its inner diameter or bore being indicated by A, its ends being bent flange-like at 17a towards the axis X. The axial length of the bushing 17 is somewhat smaller than the length of the hub 18 which therefore extends at both ends beyond the bushing 17.

The rubber ring 19 considered in a free condition (Figure 4) comprises a revolving body having an axial cylindrical bore 35 of a diameter $d$ smaller than the above-mentioned diameter D. The circumferential surface of the ring 19 comprises two cylindrical annular zones 37, 36, having a common radius $R_1$ which are axially spaced by a circumferential groove 38 of generally trapezoidal profile. The radius $R_1$ is larger than $R$, The bottom 39 of the groove 38 is cylindrical, the flanks 40, 41 of the groove comprising substantially truncoconical surfaces flaring towards opposed ring ends.

An annular groove 42, 43, respectively, concentric with the axis X is formed on each of the two end faces of the ring 19. The grooves 42, 43 are each of V-shaped profile, the V-bottom being situated on a circumference having a radius $R_2$ which equals approximately at least half the radius $R_1$. It may therefore be said that the ring 19 is of general grooved-pulley shape, having a hub portion 44 and a rim made up of the annular cylindrical zones 36, 37 confining the groove 38 therebetween. As will be visible from Figure 4, the hub portion 44 is greater in axial length than the width $L_1$ of the rim portion. The said axial length equals the axial length of the tubular metal hub 18. However, the width $L_1$ is somewhat smaller than the spacing L of the flanges 17a, 17a on the bushing 17.

On assembly, the rubber ring 19 is first of all fitted on the hub 18, the difference of the diameters D and d causing the ring 19 to expand radially. Subsequently, the unit 18, 19 is forced into the bushing 17. When $R<R_1$ and $L<L_1$, the rim portion of the ring is radially and axially compressed as shown by Figure 3. In this preferred embodiment of the invention it is essential for the dimensional ratios to be mutually correlated in such manner that the circumferential groove 38 forms in the finished hinge an annular chamber 45. The width $L_2$ of this chamber should preferably range between one fourth and one half the width L.

It should be explicitly emphasized at this stage that the purposes of this invention are actually fulfilled provided the ring 19 is compressed radially at least between the hub 18 and bushing 17. A large number of tests were carried out under this aspect by way of experiments on similar structures, in which a ring like 19 was merely glued to the bushing and hub without appreciable prestress. As a result, it was found that such structures rapidly deteriorated and were therefore useless in practice.

In the embodiment shown in Figures 5 and 6, the rubber ring 119 comprises circumferential annular cylindrical zones 136, 137, 138 similar to the abovedescribed annular cylindrical zones 36, 37 and 38, inclusive of their respective dimensional ratios. However, in the embodiment now described the end faces 142, 143 are flat, the tubular metallic hub having ends 118a, 118a enlarged to a truncoconical shape. The bushing 117 is similar to the bushing 17 shown in Figure 3. The hinge according to the last described embodiment is somewhat more rigid than the hinge shown in Figures 3 and 4.

The ring 219 shown in Figure 8 is formed with a truly cylindrical circumferential surface 250, each of its end faces being formed with an annular groove 242, 243, respectively, in a fully similar manner to the grooves 42, 43 in Figure 4. The bushing 217 is likewise similar to the bushing 17. However, the metal hub 218 is formed with outwardly flanged ends, as indicated by 218a.

In the embodiment shown in Figures 9 and 10, the rubber ring 319 is formed with an outer circumferential surface comprising three cylindrical annular zones 336, 337 and 351 spaced by two circumferential grooves 338, 338a. The abovementioned three annular zones have a common radius $R_1$ larger than the inner radius or bore R of the bushing 317, in a manner similar to that described with reference to Figures 3 and 4. Annular grooves 342, 342a, and 343, 343a, respectively, concentrical with the axis X are formed on each of the two end faces. Moreover, two annular grooves 352, 353 are formed in the inner circumferential surface of the ring 319, their bottom portions radially facing approximately at least the bottom portions of the co-operating grooves 338, 338a. In this case also, the mutual proportions of R, $R_1$, L, $L_1$ etc. are so correlated that in the finished hinge shown in Figure 9, the circumferential grooves form annular chambers 345, 345a, 358, 358a, the overall length (a+b) of which, taken at their contact zone with the bushing 317, preferably ranges between one fourth and one half L. The annular chambers result in an annular rubber mass 360 centrally arranged with respect to the hinge ends, as well as two annular end masses 361, 362.

It can be easily seen from Figure 9 in connection with the joint shown in Figures 1 and 2 that in operation under normal conditions the mass 360 is prevailingly subjected to compression stresses, the fluctuations in load depending almost exclusively on normal fluctuations in the transmitted torque which follow one another at a rather low frequency. The heat by hysteresis is therefore moderate and easily dispersed. The annular masses 361, 362 behave in a similar manner, but are subjected to much more frequent fluctuations in load on account of the oscillations of the hub 318 about the centre C of the hinge, the said oscillations hardly affecting the central mass 360. As compared with the latter, the masses 361, 362 are much more flexible and are arranged in direct contact with the outer air. This results in a resilient joint equipped with hinges of the type shown in Figures 9 and 10, which is capable of transmitting considerable torque, though it is highly flexible and is not subject to overheating.

It should be emphasized at this stage that though the preamble to the specification and appended claims include the possibility of providing a plurality of circumferential grooves, such as 38 or 338, 338a, an increase in number of the grooves to three, four or more is not advisable. Best results are obtained from rubber rings substantially corresponding to Figures 4 and 10, any further increase in number of the circumferential grooves merely leading to a circumferentially rilled rubber sleeve, which lies outside the scope of this invention and is incapable of fulfilling the purposes thereof.

However, it will be understood that this invention is not limited to the embodiments shown on the drawing which may be modified, if necessary, in accordance with requirements without departing from the scope of the invention as defined by the appended claims.

What I claim is:

1. A resilient bearing comprising a rigid hub and a rigid bushing in a mutually concentric arrangement, a rubber ring concentrically positioned between the hub and bushing in a radially pre-compressed condition, the said ring having circumferential and end surfaces, an annular groove on the outer circumferential surface of the ring located on a middle transverse plane of the ring, the said groove having an outwardly flaring substantially trapezoidal cross-sectional profile when seen in non-compressed condition of the ring the largest width of which ranges between one fourth and one half of the axial length of the crown section of the ring in assembled condition of the bearing, and a V-shaped annular groove on each end surface of the ring.

2. A resilient bearing comprising a rigid hub and a rigid bushing in a mutually concentric arrangement, a rubber ring concentrically positioned between the hub and bushing in a radially pre-compressed condition, the said ring having circumferential and end surfaces, an annular groove on the outer circumferential surface of the ring located on a middle transverse plane of the ring, the said groove having an outwardly flaring substantially trapezoidal cross-sectional profile when seen in non-compressed condition of the ring the largest width of which ranges between one fourth and one half of the axial length of the crown section of the ring in assembled condition on each end surface of the ring, the bottom of each V-shaped groove being located on a circumference substantially equalling in radius one half of the largest radius of the ring considered in non-compressed condition.

3. A resilient bearing comprising a rigid hub and a rigid bushing in a mutually concentric arrangement, a rubber ring concentrically positioned between the hub and bushing in a radially pre-compressed condition, the said ring having circumferential and end surfaces, an annular groove on the outer circumferential surface of the ring located on a middle transverse plane of the ring, the said groove having an outwardly flaring substantially trapezoidal cross-sectional profile when seen in non-compressed condition of the ring the largest width of which ranges between one fourth and one half of the axial length of the crown section of the ring in assembled condition on each end surface of the ring, the said bushing comprising inwardly flanged ends mutually spaced through a distance which is smaller than the axial length of the crown section of the ring in non-compressed condition, whereby the said crown section is axially compressed between the flanged ends of the bushing.

References Cited in the file of this patent

UNITED STATES PATENTS

| | | |
|---|---|---|
| 1,786,720 | Moore et al. | Dec. 30, 1930 |
| 2,256,752 | Sawrer | Sept. 23, 1941 |
| 2,505,767 | Guy | May 2, 1950 |
| 2,517,791 | Hutton | Aug. 8, 1950 |
| 2,621,923 | Krotz | Dec. 16, 1952 |
| 2,742,770 | Graham | Apr. 24, 1956 |

FOREIGN PATENTS

| | | |
|---|---|---|
| 213,019 | Great Britain | Mar. 27, 1924 |
| 478,101 | Great Britain | Jan. 12, 1938 |
| 982,427 | France | Jan. 31, 1951 |